United States Patent Office 3,717,367
Patented Feb. 20, 1973

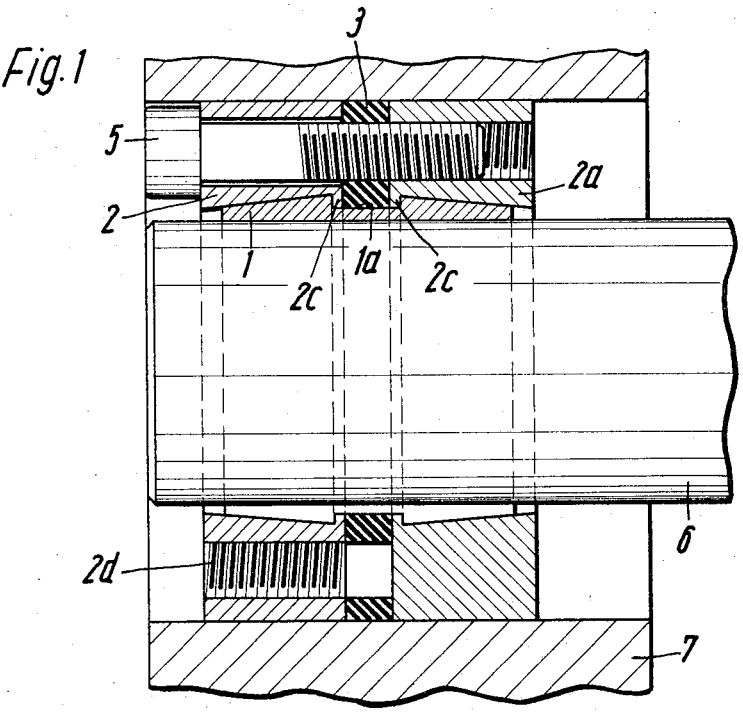
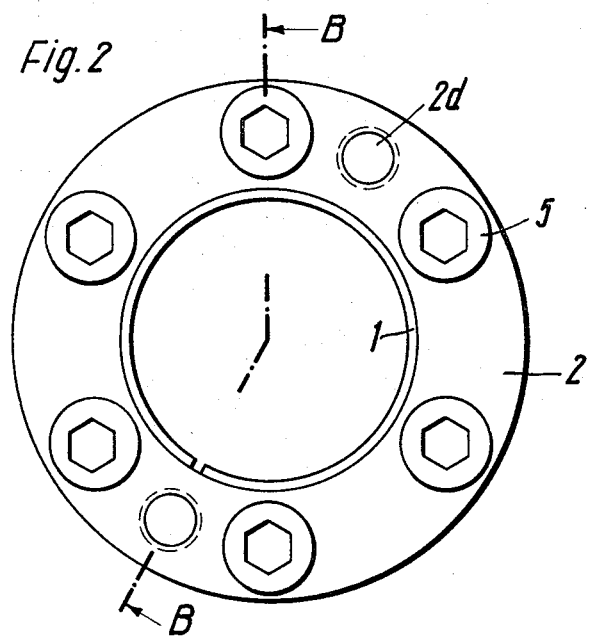

3,717,367
UNITARY HUB-SHAFT INTERCONNECTION
ASSEMBLY
Oskar E. Peter, Schlosstrasse 9/1, 7129 Brackenheim,
Germany, and Lothar Peter, Guglingen, Germany; said
Lothar Peter assignor to said Oskar E. Peter
Filed Apr. 21, 1972, Ser. No. 246,198
Claims priority, application Germany, Dec. 2, 1971,
P 21 59 813.0
Int. Cl. F16d 1/06
U.S. Cl. 287—52.06                                    7 Claims

ABSTRACT OF THE DISCLOSURE

An inner ring has a cylindrical surface adapted to seat on a shaft and an outer double-conical surface with a notch or groove circumferentially extending in the middle thereof; a pair of outer rings with inner conical surfaces, adapted to seat against the outer conical surface are provided, the outer rings being formed with collars engaging the groove or notch of the inner ring, to provide a unitary assembly. The outer surfaces of the outer rings are cylindrical to seat within the hub, the outer rings being pierced axially to permit tightening screws to be passed therethrough to tighten the conical surfaces of the outer rings and the inner ring with respect to each other, and provide for wedging the parts together and transmission of torque.

---

The present invention relates to a unitary hub and shaft interconnection assembly and more particularly to the type of interconnection assembly which is, for example, shown in German patent publication document 1,931,679.

Hub-to-shaft interconnection assemblies have been proposed in which an inner ring is provided which can seat on the shaft, the ring having a double-conical outer surface. Outer rings then are provided with corresponding conical surfaces, the outer surfaces of the outer rings being again cylindrical to seat within the hub of the element to be interconnected to the shaft. Tightening screws pass between the outer rings, the tightening screws being located in a planetary arrangement about the center of the shaft, to tighten the outer rings against each other so that the conical surfaces of the outer rings will slide over the conical surfaces of the inner rings, wedging the rings against each other and thus wedging the hub to the shaft.

It is an object of the present invention to provide a hub-to-shaft interconnection which can be made as a unitary assembly so that the outer elements cannot be removed from the inner ones, that is, to prevent loss of parts with respect to each other even if the screws or bolts which interconnect them are removed; and to provide for transmission of higher torques between the hub and the shaft to be interconnected. Additionally, the interconnection should be so arranged that it can be loosened, that is, to permit the hub to be removed from the shaft, preferably without the use of any special removal tools.

Subject matter of the present invention

Briefly, an inner ring is provided which has an inner cylindrical surface adapted to seat on the shaft. A pair of double-conical surfaces, diverging, preferably from the center portion, are formed on the outer surface, the double-conical surfaces being separated from each other by a circumferential groove or notch. A pair of outer rings are provided which have outer cylindrical surfaces adapted to seat in the cylindrical bore of the hub. The inner surfaces of the outer rings are singly conical, to match the conical surfaces of the inner ring and seat thereon. Each one of the outer rings, additionally, has a collar formed at the terminal end, the collar engaging in the groove or notch of the inner ring. The cross-sectional wall thickness of the outer rings is so arranged that it is greater than the cross-sectional wall thickness of the inner ring. Tensioning means, such as bolts passing through holes in one of the outer rings and engaging threaded openings in the other permit tightening the outer conical rings against each other. Preferably, a sealing ring of elastically compressible material is located in the region of the groove of the inner ring to provide a fluid seal between inner and outer rings, and thus between the hub and the shaft.

The arrangement in accordance with the present invention permits secure coupling and interconnection of double-conical inner rings, even though the rings may be radially slotted, and thick outer rings. The arrangement permits conical angles which are self-binding, that is, which have a taper so arranged that it permits a greater torque to be transmitted between the hub and the shaft. Yet, by providing in accordance with a feature of the invention, threaded blind bores in one of the outer conical elements so that screws can be inserted therein to bear with their end faces against the other conical element, the conical elements themselves can be released from binding or wedging relationship. Additional removal or loosening tools are thus not required. The complete assembly is always ready for interconnecting of hubs and shafts and the elements thereof are coupled together in one installation-ready unit without any loose parts which may get lost. The type of hub-to-shaft connection to which the present invention relates is shown in detail in the aforementioned German patent publication 1,931,679, published Jan. 7, 1971.

The interconnection assembly utilizes an axially slit inner ring 1 having an inner cylindrical surface, and an outer double-conical surface. The double-conical surface is formed, in the middle thereof, with a groove 1a which, in a cross-section, is channel-shaped. The two conical surfaces are mirror images of each other. They match conical surfaces formed on thick-walled outer tensioning rings 2, 2a. Each one of the outer tensioning rings 2, 2a has an inner hook-like collar 2c formed thereon. The collar preferably extends entirely circumferentially. A ring-shaped disk 3 of compression resistant rubber, plastic or the like is located between the thick-walled outer rings 2, 2a and likewise seats in groove 1a of the inner ring, between the collars 2c of the outer conical ring. The outer conical ring 2, adjacent the axial end of the shaft and the hub is formed with six bores, matching six similar bores in ring 3. The interior (from an axial point of view) conical ring 2a is formed with threaded bores, into which bolts 5 can be threaded. The bolts 5 preferably are Allen head bolts having an inner socket to be engaged by hexagonal keys. The bolts 5 pass through the holes in outer ring 2, in sealing ring 3, and are threaded into the matching bores of inner ring 2a. The assembly of inner and outer rings and of sealing disk can thus be interposed between a shaft 6 and a hub 7, without any separable parts requiring separate holding or interconnection.

In use, the Allen head bolts 5 are tightened and move the thick-walled, closed outer rings 2, 2a with their circumferential collar 2c over the conical outer surfaces of the slotted inner ring 1. The movement is towards each other, thus wedging the inner ring 1 on the shaft 6 and the outer rings 2, 2a within the bore of the hub 7, providing substantial radial pressure. The deformable disk 3, of rubber or plastic, is stressed axially and will not only seal against the groove 1a, and its outer circumference, which fits within the hub 7, but also against the bolts 5, providing additional friction for transmission of torque and reliable sealing. The disk 3 additionally secures the bolts 5 against undesired loosening, for example under machine operation or vibration, by providing a frictional binding force against the overall circumference of the bolts 5.

The conical surfaces are so tapered, or so arranged that they are self-binding. To loosen the connection, the outer ring 2 is formed with additional threaded bores 2d (see FIG. 2) which match similar openings in the disk 3. The bores 2d do not, however, have matching bores in the ring 2a, located interiorly thereof (see lower half of FIG. 1). Removal of two of the bolts 5 from the threaded bores in the interior ring, and threading these bolts into the holes 2d will provide end pressure by the bolts against the end faces of the inner ring 2a to separate the conical surfaces from each other, and thus to break the wedge-interconnection between the conical surfaces of the inner and outer rings and permit removal of the hub-to-shaft interconnection assembly without any additional stripping tools.

The assembly is connected by slightly compressing the inner ring 1a, and then snapping the collars 2c within the groove 1a.

Various changes and modifications may be made within the inventive concept.

We claim:
1. Unitary hub-to-shaft interconnection assembly comprising
an inner ring (1) having an inner cylindrical surface adapted to seat on a shaft (6), and an outer double-conical surface tapering from a central thicker section to thinner outer zones;
and a groove (1a) formed in the outer surface of the central zone of the ring;
a pair of outer rings (2, 2a), each having an outer cylindrical surface adapted to seat in the bore of a hub (7) and each having an inner conical surface, matching and seating on the respective conical surfaces of the inner ring (1) and radially extending projecting means (2c) formed on the thinner terminal ends of the conical surfaces of the outer rings and engaging the groove (1a) of the inner ring;
the cross-sectional wall thickness of the outer rings being greater than the cross-sectional wall thickness of the inner rings;
and tensioning means (5) engaging the pair of outer rings to tighten the conical surfaces against each other and tighten the interconnection between the hub and the shaft.

2. Assembly according to claim 1, wherein the radially projecting means comprises a circumferential collar (2c).

3. Assembly according to claim 1, further comprising a sealing ring of elastically compressible material located in the groove (1a) of the inner ring and separating the outer rings in axial direction, the outer diameter of the sealing ring fitting within the hub.

4. Assembly according to claim 1, wherein the tensioning means comprises threaded bolts passing axially through one of the outer rings and threads formed in the other outer ring to permit tightening of the rings against each other.

5. Assembly according to claim 4, further comprising at least one threaded bore in said one of the outer rings to permit removal of a bolt from the threaded bore in the other ring and, upon insertion and threading into said threaded bore in said one ring, press said rings away from each other and release the conical surfaces from each other.

6. Assembly according to claim 5, further comprising a sealing ring (3) of elastically compressible material located in the groove of the inner ring and separating said outer rings in axial direction, said sealing ring being formed with an opening matching the opening of the threaded bore in said one of the rings to permit passing the bolt therethrough and bear against an end face of the other ring.

7. Assembly according to claim 1, wherein the inner ring is a split ring.

References Cited

UNITED STATES PATENTS

| | | | |
|---|---|---|---|
| 525,775 | 9/1894 | Wainwright | 287—52.06 X |
| 3,043,613 | 7/1962 | Papageorges | 287—52.06 |

ANDREW V. KUNDRAT, Primary Examiner

U.S. Cl. X.R.

279—2